H. Gary.
Grain Fork.
Nº 97,187. Patented Nov. 23, 1869.
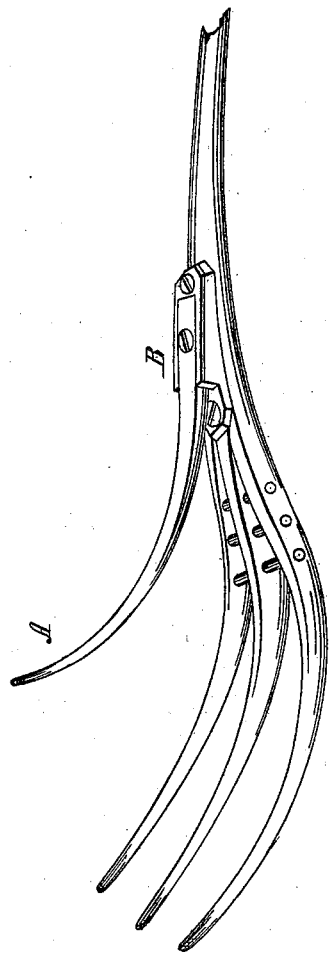
Witnesses:
Francis Snowden
John O. Raum
Inventor:
Hiram Gray,
by
Geny C. Taylor
Attorney.

United States Patent Office.

HIRAM GARY, OF CROTON, NEW JERSEY.

Letters Patent No. 97,187, dated November 23, 1869.

IMPROVEMENT IN LOOSE-GRAIN FORKS.

The Schedule referred to in these Letters Patent and making part of the same.

*To all whom it may concern:*

Be it known that I, HIRAM GARY, of Croton, in the county of Hunterdon, and State of New Jersey, have invented a new and useful Improvement in Loose-Grain Forks; and I do hereby declare that the following is a full, clear, and exact description of the same, reference being had to the accompanying drawing, and letters of reference marked thereon, making a part of these specifications.

The drawing represents a longitudinal view of my improvement.

My improvement consists in providing an ordinary grain or hay-fork with a tongue or spring permanently secured at or near the ferrule, at the lower end of the stale, or handle, and above the tines, or prongs, as shown in the drawing, particularly adapted to the handling of loose grain or straw, thus preventing the grain or straw from falling off the fork, when required to be pitched upon a wagon or stack.

To enable others to make use of my invention, I will proceed to describe the same.

A, in the drawing, represents a tongue or spring, curved in the same manner as the tines, secured to the fork-stale above the ferrule, where the tang of the tines enters the haft at B. This tongue or spring may be constructed either of wood or metal, as desired, and extends about two-thirds of the length of the tines or prongs, so that when the tines or prongs enter the loose grain, hay, or straw, the tongue or spring holds it secure. This is of great advantage when loading or stacking loose grain or straw, as three-fourths of the time usually occupied in handling the same are saved by my device.

Having thus fully described my invention,

What I claim, and desire to secure by Letters Patent, is—

The tongue or spring A, constructed either of wood or metal, for loose-grain forks, secured to the stale or handle, as herein described, for the purposes set forth.

In testimony whereof, I have signed my name to this specification, in the presence of two subscribing witnesses.

HIRAM GARY.

Witnesses:
FRANCIS SNOWDEN,
SALLIE M. TAYLOR.